Aug. 21, 1923.
A. N. SCHOENUNG
1,465,872
HEADLIGHT DIMMING DEVICE
Filed July 11, 1922
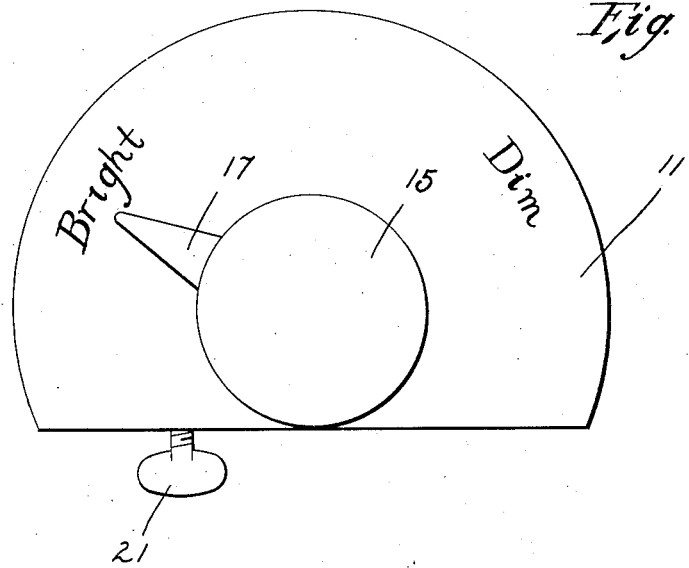
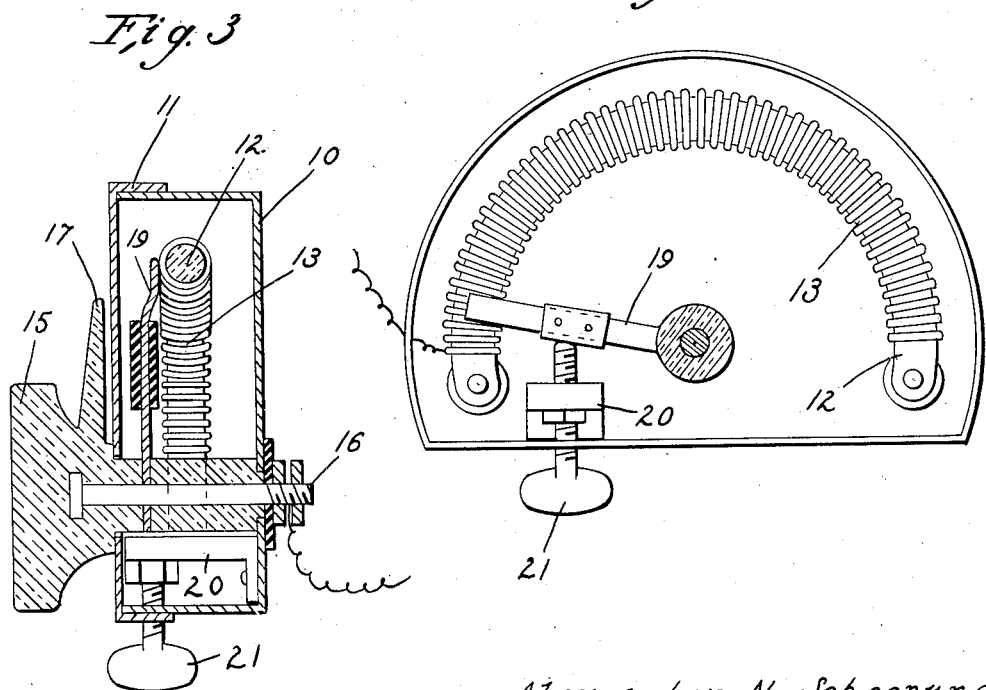
Alexander N. Schoenung
INVENTOR Patented Aug. 21, 1923.

1,465,872

UNITED STATES PATENT OFFICE.

ALEXANDER N. SCHOENUNG, OF CHILTON, WISCONSIN.

HEADLIGHT-DIMMING DEVICE.

Application filed July 11, 1922. Serial No. 574,264.

*To whom it may concern:*

Be it known that I, ALEXANDER N. SCHOENUNG, a citizen of the United States, residing at Chilton, in the county of Calumet and State of Wisconsin, have invented new and useful Improvements in Headlight-Dimming Devices, of which the following is a specification.

This invention relates to control switches and has for its object the provision of a novel device of rheostat construction for interposition between the control switch and headlights of an automobile for the purpose of controlling the brilliancy of illumination of the bulbs so as to avoid glare and comply with the regulations of the various states.

An important object is the provision of a control device of this character which may be mounted upon the dash or instrument board of an automobile and manually controllable whereby to regulate the intensity of the current fed to the bulbs so that they may be allowed to burn either bright or dim.

An additional object is the provision of a device of this character which will be simple and inexpensive in manufacture, efficient and durable in use and a general improvement in the art.

With the above and other objects and advantages in view the invention consists in the details of construction to be hereinafter more fully described and claimed and illustrated in the accompanying drawings, in which:

Figure 1 is a front elevation of the device,

Figure 2 is a view thereof with the cover plate removed,

Figure 3 is a cross section.

Referring more particularly to the drawings I have shown my device as comprising a circular casing 10 having a cover plate 11, this casing being of such construction that it may be easily installed upon the instrument board or dash of an automobile. The material from which the structure is formed is a small matter as it might vary to meet different conditions and it is likewise apparent that many changes may be made in the dimensions.

Mounted within this casing and suitably bolted or otherwise secured therein is an arcuate bar or strip 12 of porcelain upon which is wound a coil of resistance wire 13 of suitable gage depending upon the amount of resistance desired. One terminal of this wire coil is connected with the control switch for the electric lights of the automobile equipped with the device.

Journaled transversely of this casing at the center thereof is an operating knob 15 having a threaded stem 16 passing through the center of the casing and retained in position by means of nuts or other securing means. This knob carries a pointer 17 which moves over legends "Bright" and "Dim" inscribed upon the face plate or cover 11. Secured upon the stem 16 within the casing is a contact arm 19 movable over the wire coils 13 and of sufficient width to engage three convolutions at one time to avoid flickering of the lights when adjustment is made from bright to dim or vice versa. It is of course apparent that the stem 16 must be connected with the wire leading to the headlights so that the resistance coil 13 will be interposed in the circuit. The stem 16 must of course be insulated from the casing as otherwise a short circuit would be produced.

Located within the casing is an insulating bracket 20 through which is screwed a thumb screw 21 disposed in the path of travel of the arm 19 whereby to limit movement thereof in one direction to avoid throwing of the arm entirely beyond the end of the coil.

In the use of the device it will be seen that when the knob is rotated in one direction or the other so that the pointer 17 will be disposed over the desired legend the switch arm 19 will be correspondingly turned and engaging the resistance coil will throw more or less resistance into the circuit so as to regulate the intensity of the current supplied to the bulbs. In this way it will be seen that the device will operate to control the headlights, that is the brilliancy thereof so as to avoid glare and insure compliance with the regulations.

Having thus described my invention I claim:

A control device for the headlights of automobiles, comprising a casing, a curved support of insulating material mounted therein and carrying a coil of resistance wire, a stem journaled through the center of the casing and carrying an operating knob provided with a pointer, the casing having a face plate provided with legends indicative of brightness, a switch arm on said stem movable over and engaging a plurality of the convolutions of the resistance coil and means for limiting movement of the knob and arm in one direction, said means comprising a bracket mounted within and insulated from the casing, and a set screw projecting beyond the casing and threaded through said bracket and having its free end disposed in the path of travel of said arm.

In testimony whereof I affix my signature.

ALEXANDER N. SCHOENUNG.